(No Model.) 4 Sheets—Sheet 1.
C. COTTIS.
HORSE HOE.
No. 505,349. Patented Sept. 19, 1893.
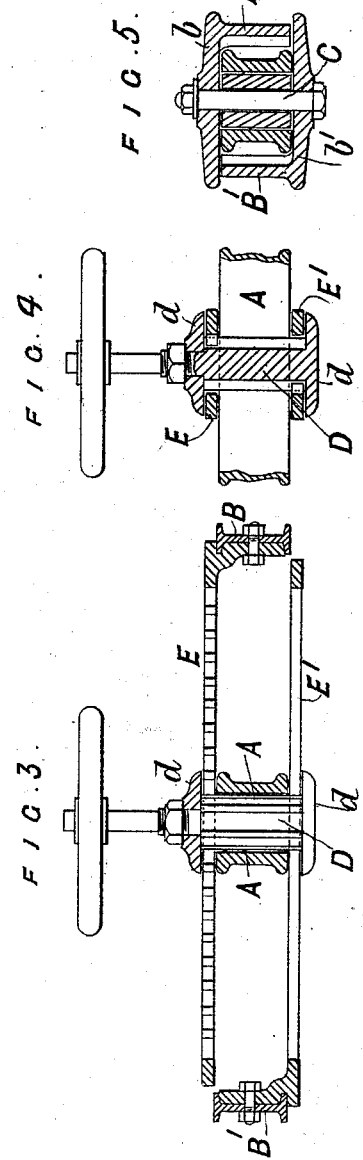
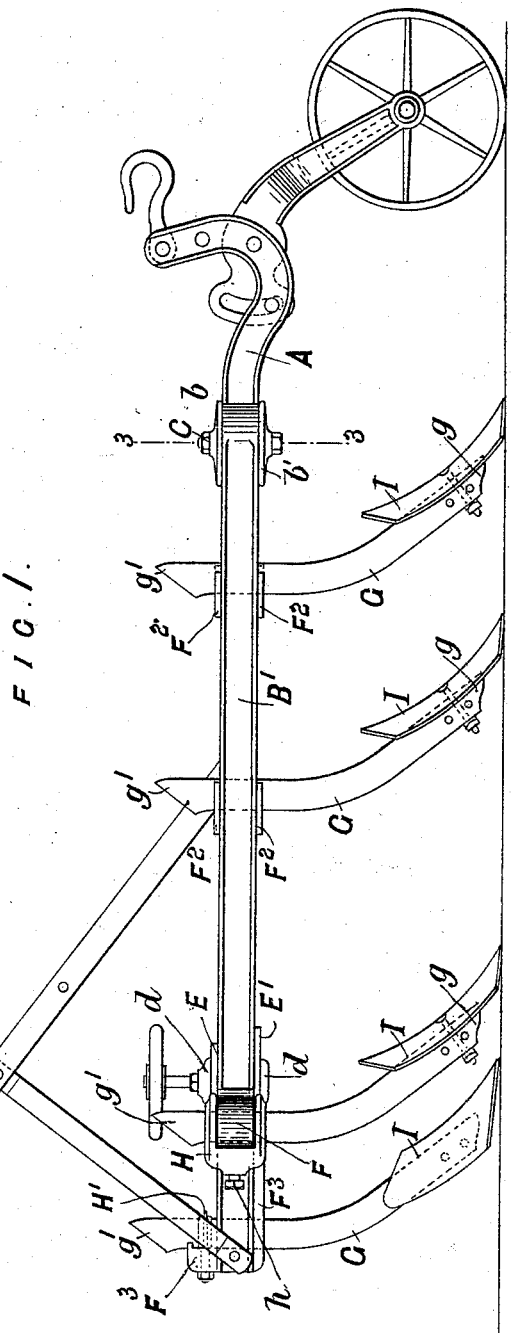

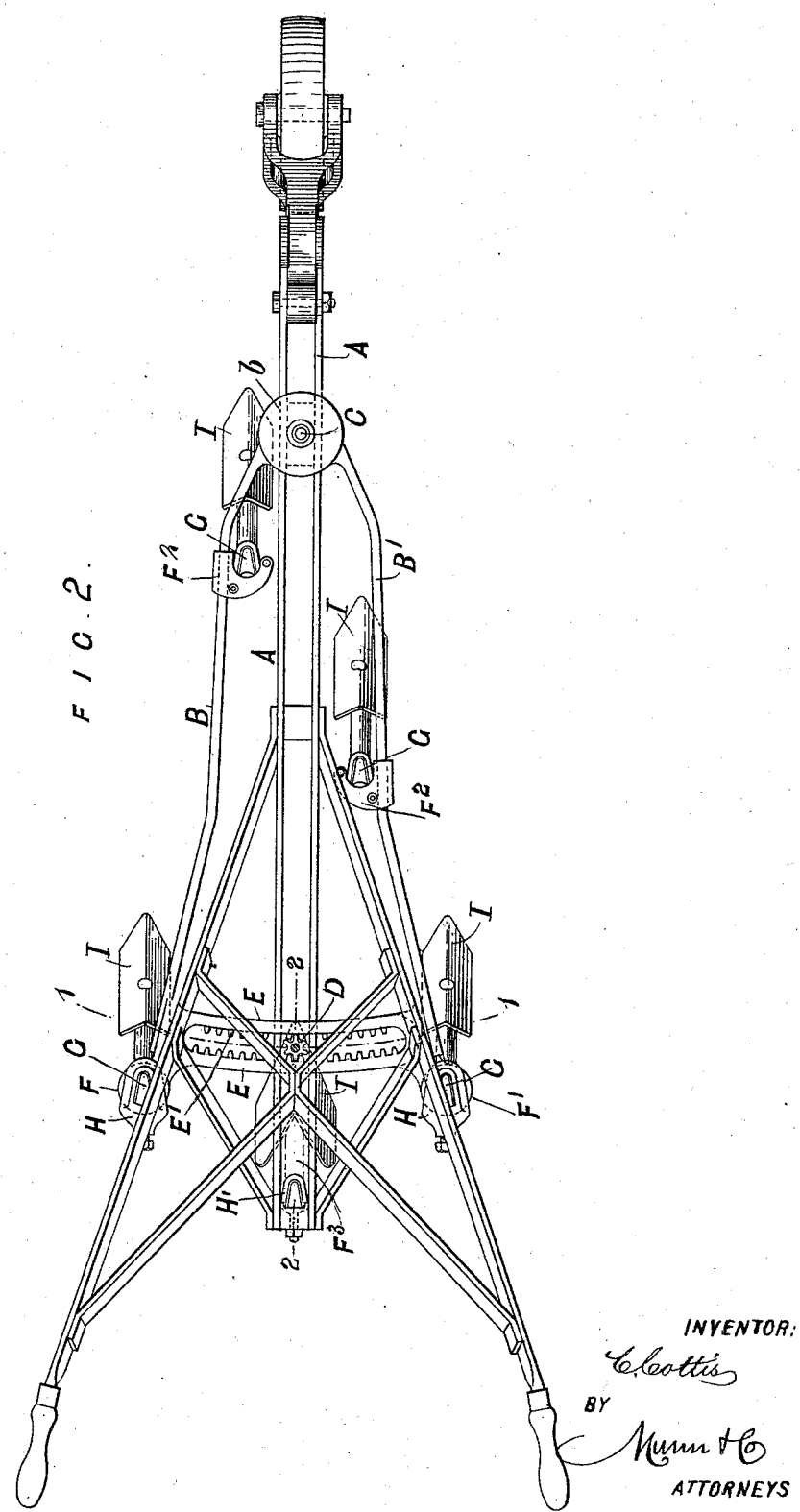

(No Model.) 4 Sheets—Sheet 3.

C. COTTIS.
HORSE HOE.

No. 505,349. Patented Sept. 19, 1893.

WITNESSES.
E. M. Clark
C. Sedgwick

INVENTOR:
C. Cottis
BY Munn & Co
ATTORNEYS (No Model.) 4 Sheets—Sheet 4.

C. COTTIS.
HORSE HOE.

No. 505,349. Patented Sept. 19, 1893.

WITNESSES.
C. M. Clark
C. Sedgwick

INVENTOR:
C. Cottis
BY
Munn & Co
ATTORNEYS

UNITED STATES PATENT OFFICE.

CRISPUS COTTIS, OF EPPING, ENGLAND.

HORSE-HOE.

SPECIFICATION forming part of Letters Patent No. 505,349, dated September 19, 1893.

Application filed June 17, 1893. Serial No. 477,973. (No model.)

*To all whom it may concern:*

Be it known that I, CRISPUS COTTIS, agricultural-implement maker, of The Archimedean Iron Works, Epping, in the county of Essex, England, have invented new and useful Improvements in Horse-Hoes and other Similar Agricultural Implements, of which the following is a full, clear, and exact description.

My invention relates to improvements in horse-hoes and other agricultural implements, similarly furnished with tines and hoe points, such as drag-harrows, scarifiers, and drill grubbers.

The invention relates principally to what are known as expanding horse-hoes in which the side bars of the implement are pivoted so as to be capable of adjustment laterally, to suit the width of the rows between which the tines are to act, and the improvements have for their object to enable the implement to be made lighter and stronger, to be more easily expanded and contracted and to fold up more compactly, and to enable the stalks of the tines or hoes to be adjusted along the side bars and also about their own vertical axes to keep the tines forwardly directed, whatever the degree of expansion of the frame.

The invention has also for its object to provide special means of securing the hoe-point or share to the tine or stalk, and to enable the machine to be adapted for use, either for heavy or light work, by the application of points or shares of various forms, according to requirements.

Figure 6:
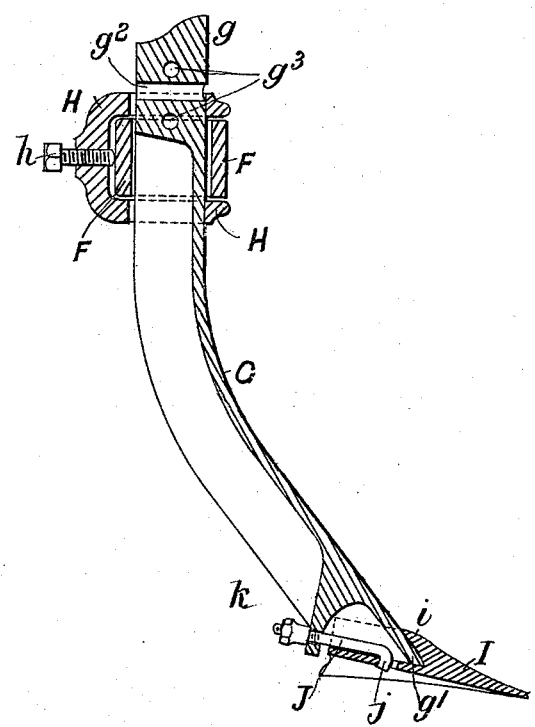
Figure 7:
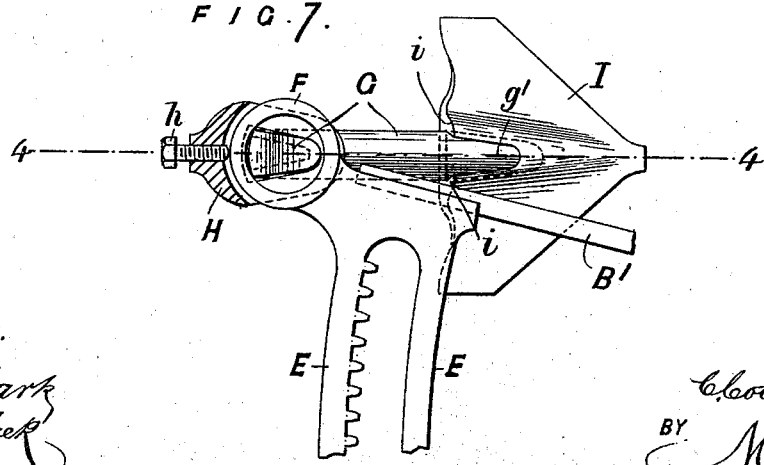
Figure 8:
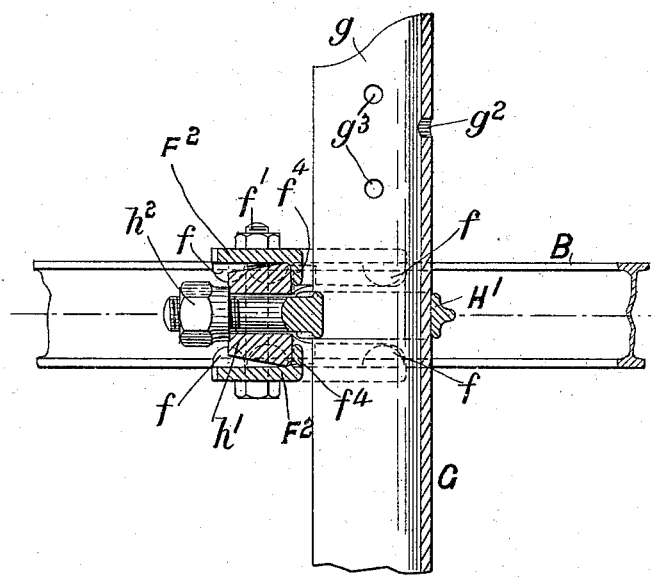
Figure 9:
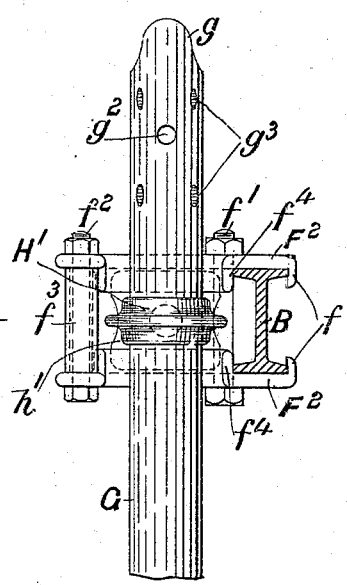
Figure 10:
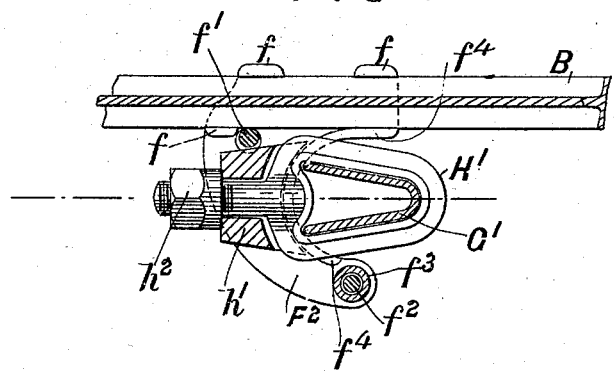

Reference is to be had to the accompanying drawings, forming part of this specification, wherein Figure 1 is a side elevation and Fig. 2 a plan of a horse-hoe provided with my improvements. The following figures are detail views, drawn to a larger scale: Fig. 3 is a cross-section on line 1—1, Fig. 2; Fig. 4 a cross-section on line 2—2, Fig. 2; Fig. 5 a cross-section on line 3—3, Fig. 1; Fig. 6 a section on line 4—4, Fig. 7 which is a plan, partly in section, of one of the rear side stalks and the bracket by which it is connected to the frame. In these views the stalk is shown reversed end for end to that shown in Figs. 1 and 2 and with a different hoe-point applied thereto. Figs. 8, 9, 10, represent the means of adjustably attaching the two forward tines to the frame.

The same letters of reference indicate the same parts in all the figures.

A is the main beam and B B' the expanding side arms of the frame pivoted to A upon a common center C (instead of on separate centers as usual) for which purpose the arms B B' terminate in disks b b' embracing respectively the top and bottom of the main beam A the joint pin passing through the latter or between the two members of which said beam is composed as shown in Fig. 5. The expanding arms B B' are operated simultaneously by a pinion D on a vertical hand wheel shaft, the pinion turning between the members of the beam A and gearing with both of two rack bars E E' respectively bolted to the side bars B B' and passing the one E above and the other E' beneath the main beam A. Each rack bar is slotted to give passage to the pinion D and curved to a radius struck from the joint C, the rack teeth of the two bars E E' being at one side of the one slot and at the other side of the other slot, so as to engage with opposite sides of the pinion D which is retained in position by passing through the slots of the rack bars and main beam A and by flanges d at top and bottom embracing the rack bars E E'. By this means the side bars B B' are moved simultaneously in opposite directions. The side bars B B' are of I-section and they terminate in annular brackets F, F'. In each bracket F, F', see Figs. 6 and 7, the stalk G of a hoe or tine is secured by a bridle piece H, adapted to embrace the upper and under sides of the bracket, said bridle piece having apertures in its upper and lower members corresponding in form to the section of the stalk G and being secured by a set-screw h whereby the stalk is held tightly against the bracket which being circular in plan admits of the stalk being readily adjusted therein about its vertical axis by merely slackening the set-screw, so that the hoe-points may be forwardly directed in lines parallel to the main beam A irrespective of the extent to which the side bars B B' may be expanded.

Figs. 8, 9, and 10, represent a vertical section, front elevation, and horizontal section, respectively, of the brackets which are bolted to the bars B B', to hold the forward hoes or tines. These brackets are of semi-circular form each composed of two members F² provided with lugs $f$ adapted to embrace the top and bottom flanges of the side bars B B' upon which the two members are clamped by bolts $f'$ $f^2$, the latter traversing a tubular distance-piece $f^3$ so that by slackening the bolts the brackets may be adjusted to any position along the bar of the frame. The two members F² have inwardly and oppositely directed flanges $f^4$ around their front semi-circular edges against which bears an abutment block $h'$ through which passes the screw-shank of the bridle piece H' and against which the nut $h^2$ on said shank bears. The bridle piece H' is a single loop corresponding in form to the section of the stalk G and passing freely between the top and bottom members F² of the bracket, so that the stalk G may be adjusted about its own vertical axis by moving it around within the semi-circularly curved edges of the members F² and secured in the desired position by tightening the nut $h^2$. These brackets are represented as being placed at the inner sides of the bars B B' but they may be placed at the outer sides thereof which will admit of the said bars being folded close alongside of the main beam A. The stalks G are made of channeled or V-section and are curved at the middle portion only for about a third of their length, to give the proper downward pitch to the hoe point, the end portions of the stalks being straight so that either end may be fixed in the bridle piece and bracket above described, both ends being adapted to receive hoe points or shares which are detachably secured thereto. For this purpose the one end $g$ of the stalk is pierced with a fore and aft-hole $g^2$ and two transverse holes $g^3$, the former for bolting the hoe-blade I of the American pattern and the latter for bolting a side hoe-blade (not shown) to the stalk. The other end $g'$ of the stalk is cut at an acute angle to the stalk and, owing to its V-section and the said angle, it is adapted to fit in a dovetailed or undercut and wedge-shaped groove or recess formed on the upper surface of the hoe-point I (as seen in Figs. 6 and 7) between lugs or bosses $i$ cast thereon, the stalk being wedged tightly in its groove by a screw-bolt J having a hooked end $j$ engaging in a hole in the hoe point or share, the other end of the bolt passing through a hole in an abutment $k$ cast or otherwise fixed in the channel of the tine or stalk and tightened up by a nut which being thus situated is not liable to injury and is readily accessible. The central rear stalk is secured by being clamped against a bracket F³ provided with a bridle H' similar to those on the forward parts of the frame so as to permit of vertical adjustment. The stalks shown in Figs. 6 and 7 would be of cast metal, while those shown in Figs. 8, 9, and 10, may be made of wrought steel.

I claim—

1. In an expanding horse hoe or similar implement of the kind specified, the combination, with the expanding side bars or wings pivoted on a common center on the main beam, of curved and slotted rack bars fixed thereto and lying in different planes the one above and the other below the main central beam, and of a pinion passing through the main beam and through the slots of both rack bars and gearing with both so as to move them simultaneously and equally in opposite directions, as specified.

2. In an expanding horse hoe or similar implement as specified, the combination, with the expanding wings or side bars, of brackets fixed thereto, and of bridle pieces adapted to embrace the brackets and having eyes to receive the stalks and set-screws for binding the stalks against the brackets, with facility for circular adjustment, as specified.

3. In a horse hoe or similar implement, a hoe stalk or tine curved at the middle and straight at the ends so as to be reversible end for end, in combination with a bridle piece adapted to embrace it and a bracket to which the bridle piece is secured by a set-screw, as and for the purpose specified.

4. In a horse-hoe or similar implement, the means of securing the hoe point or share to the stalk of V-form in section, which consists in the acute end of the stalk fitting as a wedge-shape dovetail into a corresponding socket in the share, in combination with a screw-bolt detachably connected, by a hook, to the share and a nut bearing against an abutment in the hollow of the stalk, substantially as specified.

Dated this 18th day of May, 1893.

CRISPUS COTTIS.

Witnesses:
 W. J. NORWOOD,
 T. F. BARNES,
*Both of 17 Gracechurch St., London, E. C.,*
 *Notary's Clerks.*